(12) United States Patent
Ciano et al.

(10) Patent No.: US 10,386,985 B2
(45) Date of Patent: Aug. 20, 2019

(54) USER INTERFACE PATTERN MAPPING

(71) Applicant: International Business Machines Corporation, Armonk, NY (US)

(72) Inventors: Giuseppe Ciano, Rome (IT); Gianluca Della Corte, Rome (IT); Leonida Gianfagna, Rome (IT); Luigi Massa, Rome (IT); Antonio M. Sgro, Fiumicino (IT)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 14/798,501

(22) Filed: Jul. 14, 2015

(65) Prior Publication Data
US 2017/0017349 A1   Jan. 19, 2017

(51) Int. Cl.
| | | |
|---|---|---|
| G06F 8/65 | (2018.01) | |
| G06F 3/14 | (2006.01) | |
| G06F 9/451 | (2018.01) | |
| G06F 11/34 | (2006.01) | |
| G06F 9/455 | (2018.01) | |
| G06F 3/0481 | (2013.01) | |
| G06F 3/0482 | (2013.01) | |

(52) U.S. Cl.
CPC .......... G06F 3/0481 (2013.01); G06F 3/0482 (2013.01); G06F 9/451 (2018.02); G06F 9/455 (2013.01); G06F 11/3438 (2013.01); G06F 3/14 (2013.01); G06F 8/65 (2013.01)

(58) Field of Classification Search
CPC ...... G06F 11/3438; G06F 8/65; G06F 9/4443; G06F 17/30911; G06F 17/30914; G06F 2216/15; G06F 8/71
USPC ................................. 715/205, 704, 760, 762
See application file for complete search history.

(56) References Cited

U.S. PATENT DOCUMENTS

| | | | | |
|---|---|---|---|---|
| 5,392,390 A | * | 2/1995 | Crozier | G06F 15/0208 707/999.104 |
| 7,668,963 B1 | * | 2/2010 | Miner | G06F 17/3089 709/231 |
| 7,784,022 B2 | | 8/2010 | Elfner et al. | |

(Continued)

OTHER PUBLICATIONS

Luyten et al., "A Generic Approach for Multi-Device User Interface Rendering With UIML", Computer-Aided Design of User Interfaces V, 2007, pp. 175-182.

(Continued)

*Primary Examiner* — Andrew L Tank
(74) *Attorney, Agent, or Firm* — Michael A. Petrocelli

(57) ABSTRACT

A method for a mapping of user interfaces includes providing a mapping description between first data elements of a first user interface and second data elements of a second user interface, receiving input events via the first user interface, and intercepting a communication between the first user interface and an application by an interface mapper. The method also includes aggregating a series of the received input events to a first user interface pattern, transforming the first user interface pattern to a second user interface pattern based on the mapping description, and rendering the second user interface pattern in a second user interface in parallel to rendering the first user interface pattern in the first user such that both user interfaces are visible at the same time.

20 Claims, 5 Drawing Sheets

(56) References Cited

U.S. PATENT DOCUMENTS

| | | | | |
|---|---|---|---|---|
| 7,865,815 B2* | 1/2011 | Albornoz | G06F 3/0483 | 715/229 |
| 7,886,290 B2 | 2/2011 | Dhanjal et al. | | |
| 7,913,231 B2* | 3/2011 | Stienhans | G06F 11/3672 | 715/762 |
| 8,108,783 B2* | 1/2012 | Emam | G06F 3/0481 | 715/705 |
| 8,127,278 B2* | 2/2012 | Bohle | G06F 8/36 | 717/134 |
| 8,327,271 B2* | 12/2012 | Miller | H04L 43/50 | 714/46 |
| 8,549,476 B2* | 10/2013 | Shufer | G06F 11/3692 | 714/38.1 |
| 8,966,379 B2* | 2/2015 | Reeves | G06F 9/4443 | 345/158 |
| 9,201,770 B1* | 12/2015 | Duerk | G06F 11/3438 | |
| 9,229,920 B1* | 1/2016 | Fiedler | G06F 17/24 | |
| 9,425,988 B2* | 8/2016 | Smith | G06F 3/048 | |
| 2003/0018661 A1* | 1/2003 | Darugar | G06F 17/3092 | 715/239 |
| 2003/0172368 A1* | 9/2003 | Alumbaugh | G06N 5/02 | 717/106 |
| 2004/0153992 A1* | 8/2004 | Molina-Moreno | G06F 8/35 | 717/105 |
| 2005/0022115 A1* | 1/2005 | Baumgartner | G06F 17/30911 | 715/205 |
| 2005/0278728 A1* | 12/2005 | Klementiev | G06F 9/45512 | 719/328 |
| 2006/0005132 A1* | 1/2006 | Herdeg, III | G06F 9/45512 | 715/704 |
| 2006/0206808 A1* | 9/2006 | Jasthi | G06F 17/30914 | 715/234 |
| 2007/0250304 A1* | 10/2007 | Elfner | G06F 9/4443 | 703/27 |
| 2009/0300093 A1* | 12/2009 | Griffiths | G06F 9/5055 | 709/202 |
| 2010/0174708 A1* | 7/2010 | Ball | G06F 17/30867 | 707/727 |
| 2011/0173589 A1* | 7/2011 | Guttman | G06F 17/30873 | 717/125 |
| 2011/0191676 A1* | 8/2011 | Guttman | G06F 3/00 | 715/716 |
| 2011/0270959 A1* | 11/2011 | Schlusser | G06F 9/4443 | 709/223 |
| 2012/0235921 A1* | 9/2012 | Laubach | G06F 3/0238 | 345/172 |
| 2013/0080891 A1* | 3/2013 | Byun | G06F 3/048 | 715/704 |
| 2013/0268827 A1 | 10/2013 | Mercer et al. | | |
| 2013/0346950 A1* | 12/2013 | Horovitz | G06F 11/3688 | 717/128 |
| 2014/0282056 A1 | 9/2014 | Godsey | | |
| 2015/0149891 A1* | 5/2015 | Magistrado | G06F 17/2247 | 715/235 |

OTHER PUBLICATIONS

"XML Markup Languages for User Interface Definition", Technology Reports, Cover Pages Hosted by Oasis, http://xml.coverpages.org/userInterfaceXML.html#usixml, Printed on Mar. 23, 2015, pp. 1-30.

* cited by examiner

300

```
<? xml version="1.0" encoding=UTF-8>
<MappedElement>
   <name>newFile</name>
   <OldPath>
      <action1>
         <click>File</click>
         <action2>
            <click>New>/click>
         </action2>
      </action1>
   </OldPath>
   <NewPath>
      <action1>
         <click>File</click>
         <action2>
            <click>Action</click>
            <action3>
               >click>New</click>
            </action3>
         </action2>
      </action1>
   </NewPath>
</MappedElement>
```

FIG. 3

USER INTERFACE PATTERN MAPPING

BACKGROUND

The invention relates generally to a computer user interface, and more specifically, to a method for a mapping of user interfaces.

Application software or any other software program, having a user interface (UI), relies on their user interface for interacting with users. Typically, software programs undergo various versions and releases during their lifecycle. Sometimes the underlying logic of the software program is changed from version to version, in another case, the user interface of the software program may change, and in again other cases, both may be changed. User interfaces are typically graphical, window-oriented user interfaces, like e.g., portals, or mask-oriented user interfaces.

In cases, only the user interface and not the application itself may be changed from one version to another, users may have to learn how to deal with the new layout of the UI and how a sequence of patterns of different actions have to be applied, in order to achieve the same action with the underlying logic of the software program. This applies also to those cases in which the underlying application program logic has not been changed. Fundamentally, the same functionality is available—only the UI may have been changed. It may be frustrating and time-consuming for users to learn how to deal with the new UI only relying on written documentation or in a trial-and-error manner.

SUMMARY

The above-mentioned situation may be addressed by the proposed inventive concepts.

According to one aspect of the present invention, a method for a mapping of user interfaces is provided. The method for a mapping of user interfaces may include providing a mapping description between first data elements of a first user interface and second data elements of a second user interface, receiving input events via the first user interface, and intercepting, by an interface mapper, a communication between the first user interface and an application. The method may further include aggregating a series of the received input events to a first user interface pattern, transforming the first user interface pattern to a second user interface pattern based on the mapping description, and rendering the second user interface pattern in a second user interface in parallel to rendering the first user interface pattern in the first user interface such that both user interfaces are visible at the same time.

According to another aspect of the present invention, a mapping system for a mapping of user interfaces is provided. The mapping system for a mapping of user interfaces may include a receiving unit adapted for receiving input events via a first user interface and a user interface mapper adapted for intercepting a communication between the first user interface and an application. The user interface mapper may also be adapted for an aggregation of a series of the received input events to a first user interface pattern via an aggregator unit. Additionally, the user interface mapper may also be adapted for a transformation of the first user interface pattern to a second user interface pattern based on a mapping description. A user interface executor may be adapted for rendering the second user interface pattern in a second user interface in parallel to a rendering the first user interface pattern in the first user interfaces such that both user interface are visible at the same time.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
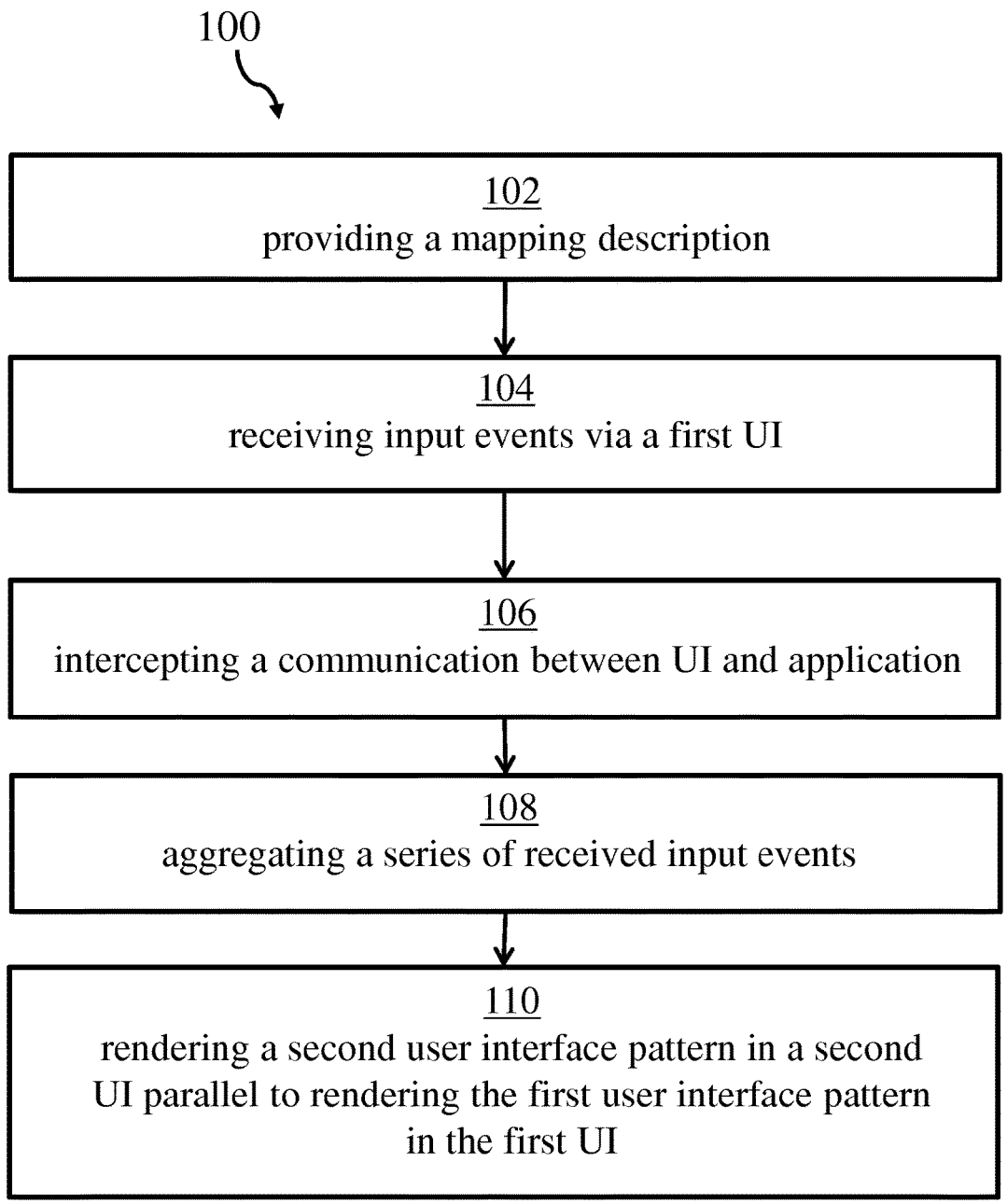
Figure 2:
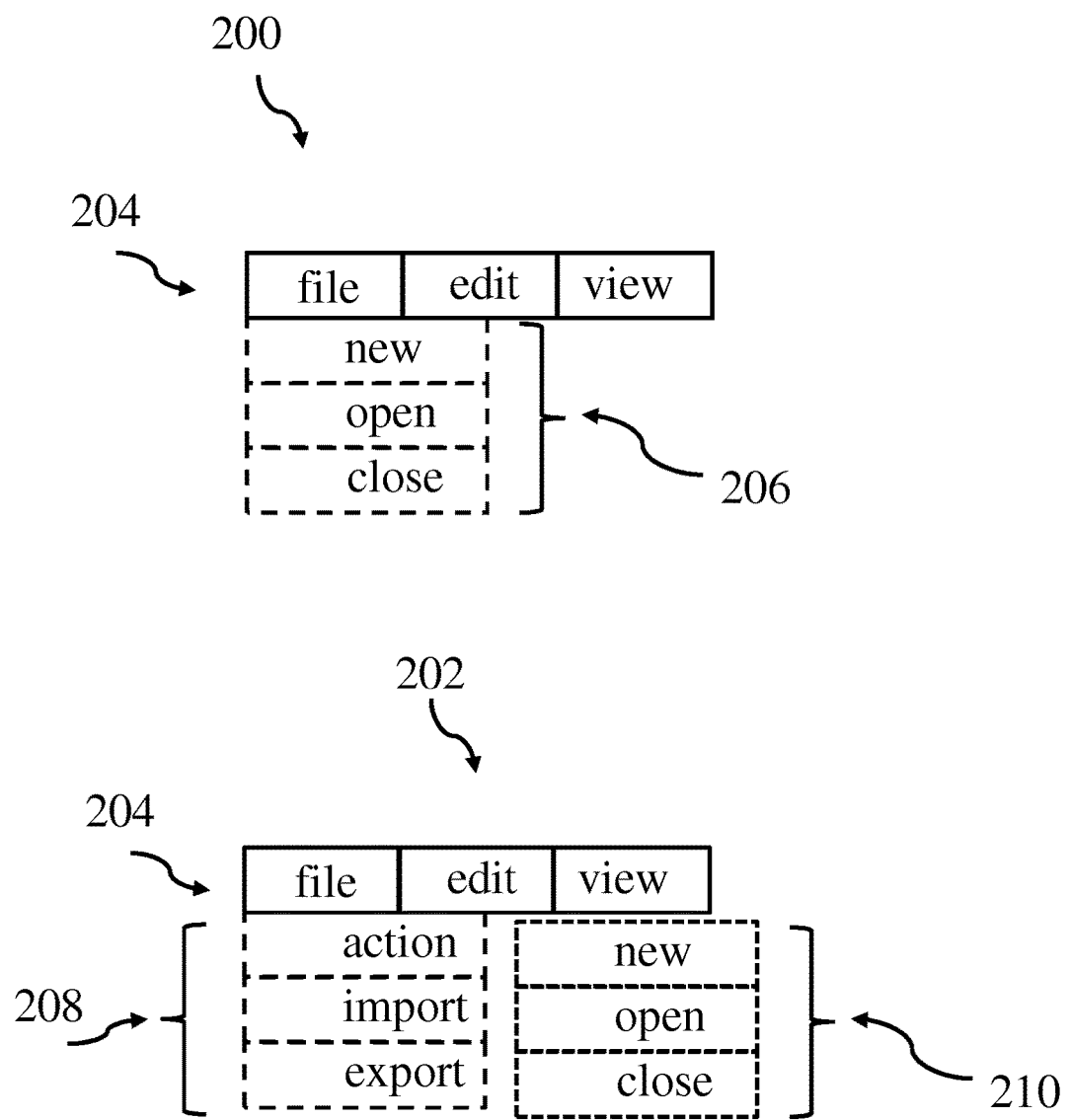
Figure 4:
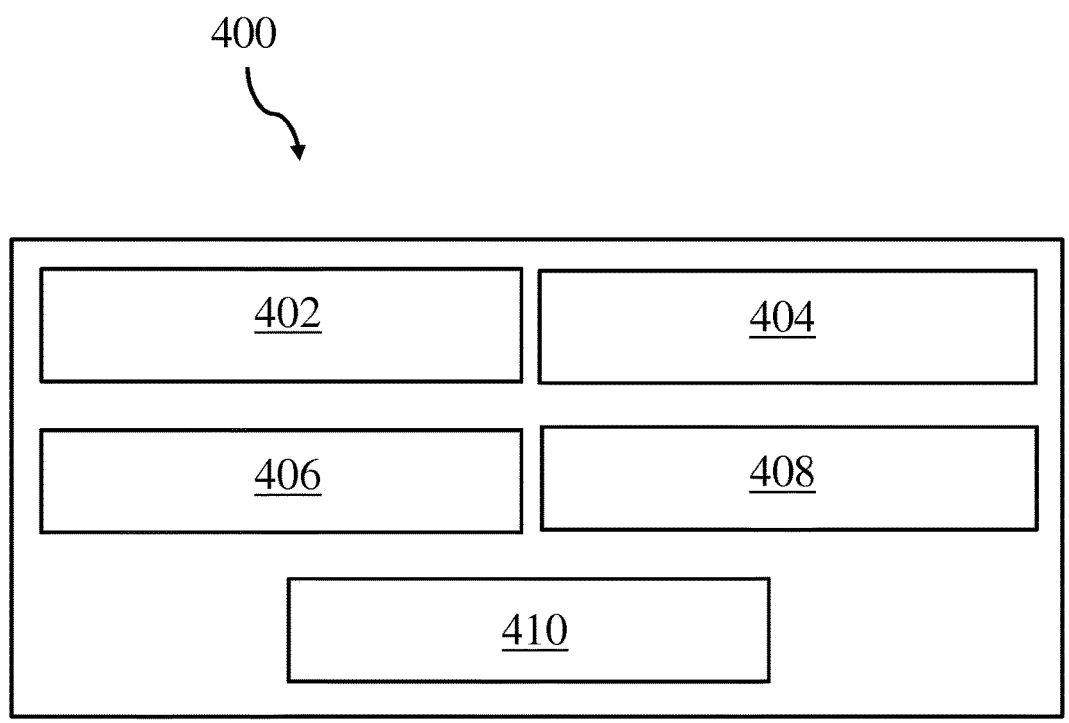
Figure 5:
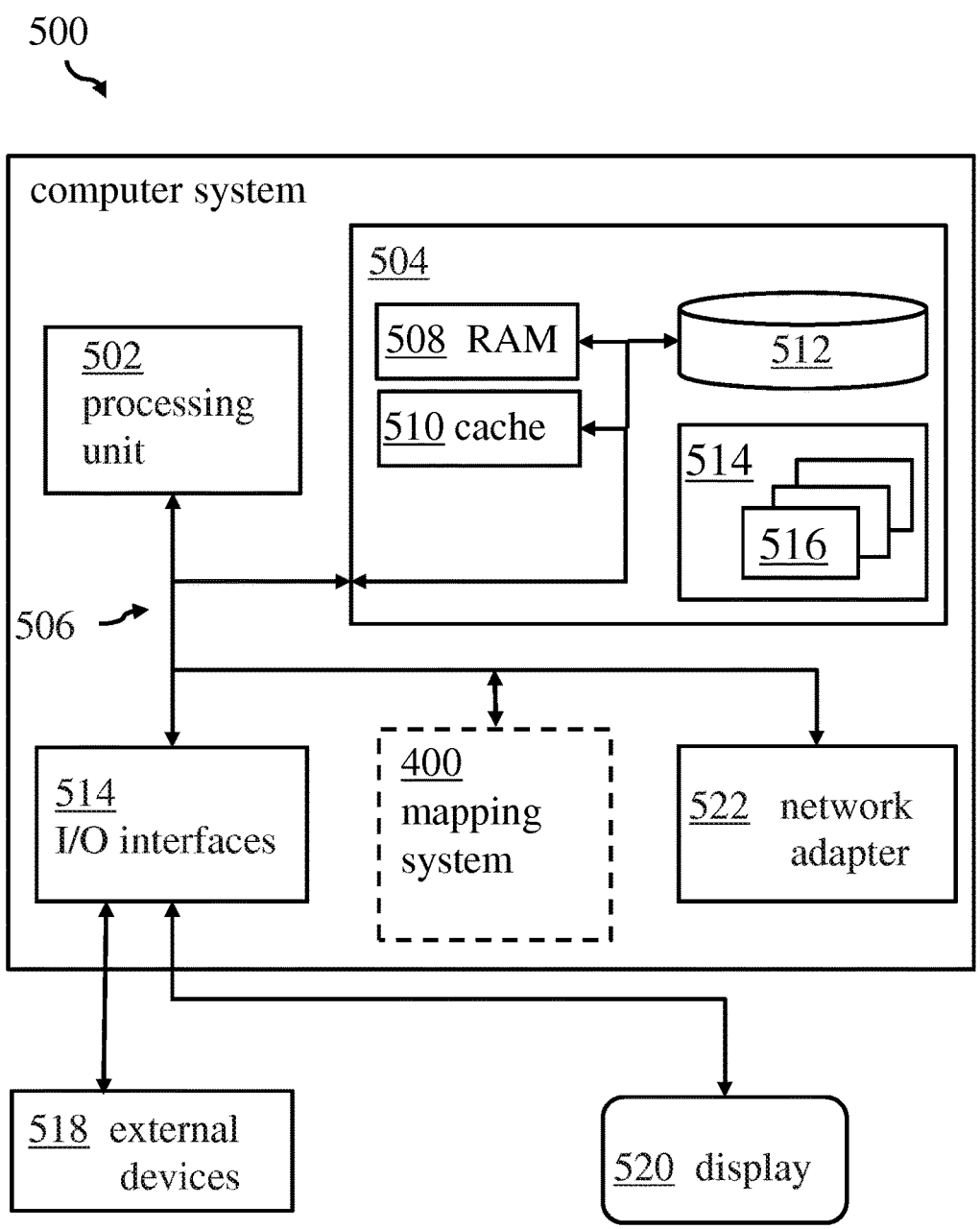

Preferred embodiments of the invention will be described, by way of example only, and with reference to the following drawings:

FIG. 1 shows a block diagram of a method for a mapping of user interfaces, according to an embodiment of the present disclosure;

FIG. 2 shows two examples of user interface appearances for performing the same task, according to an embodiment of the present disclosure;

FIG. 3 shows a listing of statements as part of a mapping description, according to an embodiment of the present disclosure;

FIG. 4 shows a mapping system, according to an embodiment of the present disclosure; and FIG. 5 shows a computing system including the mapping system, according to an embodiment of the present disclosure.

DETAILED DESCRIPTION

In the context of this description, the following conventions, terms and/or expressions may be used:

The term 'mapping description' may denote an electronic file or any other data structure including instructions how to map different user interface (UI) artifacts and UI actions from one UI to another UI. A related mapping language may be available in, e.g., XML (eXtensible Markup Language), any program code of a standard programming language, or any other format.

The term 'data element'—in particular a data element of a UI—may denote an event, an input, a clicks of a pointing device like a computer mouse, character(s) received when typed or after an enter statement or, any other UI artifact. Generally, any interaction with a UI may relate to one or more data elements. Also movements of a pointer controlled by a pointing device may relate to a data element and may be interpreted as a UI pattern. A data element may relate to a selection button, a radio button, a slider, etc. A skilled person will know the different artifacts used for interactions in a UI.

The term 'first user interface' may denote a UI typically related to a software program including the underlying logic. The UI of the software program, e.g., an application program—as well as any system program having a user interface—may vary even if the underlying logic of the software program may stay the same. Thus, the same functionality of the software program may be available but the actions in the UI required to achieve the functionality may be different.

The term 'intercepting'—in particular intercepting a communication between a user interface layer of a software program and the software program itself—may denote capturing events and/or data elements exchanged between the UI and the software program. Thus, a communication between the UI and the underlying software program may not be directly but through a functional unit that may be co-reading the exchanged communication between the UI in the software program.

The term 'user interface pattern' may denote a series of actions performed in a user interface. An example of a user interface pattern may be a sequence of clicks with a pointing device on different interactive fields in a UI. Also a track of a pointer in a UI relating to a pointing device may be interpreted as user interface pattern. A UI pattern may also only relate to only one single interaction and/or data element.

It may also be noted that an application may relate to any software program connectable to a user interface. It may be, e.g., a word processor, and mask-based application, a portal window, an operating system or components thereof interacting with the user interface, a spreadsheet program, a business application or, any other software program interacting with a UI. The related software program may not be device dependent. It may run on the server, a personal computer, a mobile device like a smart phone or tablet computer, or any other electronic device adapted to execute software programs.

The invention relates generally to a computer user interface, and more specifically, to a method for a mapping of user interfaces. The invention relates further to a mapping system for a mapping of user interfaces, a computing system, and a computer program product.

As described above, in some cases only the user interface and not the application itself may be changed from one version to another. The general function of the underlying software program may stay the same. However, learning how to deal with the new user interface typically requires training and/or a lot of time when trying to learn how to deal with the new user interface in a trial-and-error manner.

By using the proposed method for a mapping of user interfaces, embodiments of the present disclosure may, among other potential benefits, reduce a user's learning effort during a change from one UI to another UI as part of a software program update while decreasing the required computing time and resources. By displaying an old UI and a new UI in parallel on the same device (e.g. a computer screen, or side-by-side on two screens) and interacting with the software program using the old UI, a user may see directly which actions he would have to perform in the new UI by interacting with the old UI. If, e.g., a user may move a pointer using his pointing device like a computer mouse in the old, i.e., first UI, the user may see directly equivalent pointer movements of a pointer in the new, i.e., second UI in parallel. Thus, he may see directly and without any additional explanation how a program function may be performed in the new UI even if he is interacting with the old UI.

Additionally, a series of interactions with the old UI, i.e., a UI pattern, may be recorded for training purposes. The same may be done with a series of interaction with a new UI.

It may also be possible to perform the mapping from the new UI to the old UI or, the other way around. Thus, a user may get direct and unfiltered feedback whether his interacting with the new UI may achieve the functions he wants to perform if he would have used the old UI.

The translation of the interaction of a first UI to a second UI may be immediate because the interaction is displayed in parallel on both UIs.

The proposed technology may also be used to translate UI patterns between devices having different form factors, i.e., different screen sizes. A user may be reminded directly that a specific UI interaction may not be possible on a device with another form factor.

Additionally, a user may use the proposed technology for testing purposes if new UIs should be used on older technology, e.g., a screen with much less resolution. In this case, the user may interact with an application in a new UI and may observe related UI interactions on a low resolution screen.

In the following, a detailed description of the figures will be given. All instructions in the figures are schematic. Firstly, a block diagram of an embodiment of the inventive method for a mapping of user interfaces is given. Afterwards, further embodiments as well as embodiments of the mapping system for a mapping of user interfaces will be described.

Referring now to FIG. 1, a block diagram 100 illustrating the steps of a method for a mapping of user interfaces is shown, according to an embodiment of the present disclosure. The steps of the method described in the block diagram 100 may include providing at 102 a mapping description between first data elements of a first user interface and second data elements of a second user interface. The second user interface may be a newer UI for a given application. Thus, the underlying logic may not have been changed only the way, sequence of interactions flow of input variables number and kind of screen, etc. may have changed. The data elements may relate to any interaction a user may have with the user interface. That may include events generated by a pointing device or a touch sensitive screen, e.g., clicks or tracks of the pointing device, inputs in form of characters or numbers or, also multi-touch inputs on a touch sensitive screen, just to name a few examples of data elements and/or data structures related to user interfaces.

The method may also include receiving at 104 input events via the first user interface, intercepting, 106, a communication between the first user interface and an application by an interface mapper. The application may be anything with a user interface, e.g., a classical business application but also user interfaces for real-time systems, a UI of an operating system, a navigation system, a smart phone interface, a CAD program (computer added design) a net list design program for a design of processors or of other logic chips, a word processor, an email system, an input mask-based application, and so on. A skilled person will be able to expand the exemplary list.

The method may also include aggregating, 108, a series of the received input events to a first user interface pattern, and transforming the first user interface pattern to a second user interface pattern based on the mapping description. Furthermore, the method may include rendering, 110, the second user interface pattern—in particular, the input operations that a user performs using the first UI—in a second user interface in parallel to rendering the first user interface pattern in the first user interface. This may be performed on the same screen as rendering the first UI such that a user can directly see the required actions in the second UI when he uses the first UI. Thus, both user interfaces are visible at the same time for the user.

This may also be done the other way around, meaning that the first screen and the second screen may change roles.

It may be noted that also both, the software program and the UI may have been changed. Thus, the new software program may have additional functions than the older version may have had. In this case the mapping description has to reflect which old function and related UI elements correspond in the older software program with the older UI to the newer software program and related UI.

According to a preferred embodiment of the proposed method in the block diagram 100, the mapping description may be provided in XML format, i.e., stored in a file having stored XML instructions. This may make the inventive method transferable to any programming environment without artificial hurdles.

According to another optional embodiment of the method, the rendering of the first user interface and the second user interface may be performed on the same device. This has a clear usability advantage. The user may directly compare and see actions he may perform in the first UI and/or in the second UI. This technique allows for a better user productivity and thus to a better usage of existing resources and thus to an investment protection in existing computer equipment and applications. No new, or only limited, training may be required in order to use a new user interface.

According to an optional embodiment of the method, the rendering of the first user interface and the second user interface is performed on different devices. Two screen windows showing the first—e.g., older UI—and the second UI—e.g., the newer UI—side by side on the same computer screen. Possible hurdles for using the newer UI may be taken away from a scared and potentially confused user.

According to an optional embodiment of the method, the second user interface may be rendered on a device with a different form factor—in particular, a smaller form factor—if compared to the device. Thus, also different user interface patterns which are different on devices with different form factors, e.g., screen sizes may be made comprehensible for a user. Now hurdles need to be overcome for using the newer, second UI.

According to one advantageous embodiment of the method, a message is generated if a rendering of a data element on the device having the different form factor may not be possible. The message may be an acoustic sound message, like a beep and/or a visually displayed message. I.e., certain UI operations may not be available or possible on a smart phone if compared to a full desktop computer UI. Hence, a user may be prevented from testing around with expected functions on a smaller form factor device and cannot get done what he may be used to at a desktop screen. Here, the inventive method and system with help to reduce the learning effort and with this, reduce the unnecessary usage of computer equipment for tasks not available.

According to one preferred embodiment of the method, the series of received input events may be recorded. Such recorded event series which may be equivalent to usage patterns may be used for a training of a larger group of users that have to be trained to use a second—e.g., newer—UI. The recorded events series may also be run automatically, in the second UI. Thus, user may view again and again how functions and usage patterns in the first UI may be performed in the second UI.

Referring now to FIG. 2, two examples of user interface appearances for performing the same task are shown, according to an embodiment of the present disclosure. A first user interface 200 may show in a selection menu 204 three options: "file", "edit", "view". This may be applicable for any readable file. If the user may click on "file", a pull-down menu 206 may appear showing again three options "new", "open", "close". A user may decide to create a new file and may select "new". Thus, by two clicks, i.e., "file" and "new", the user may have performed his desired action: open a new file.

In the second user interface 202, the same three topline options 204 may be shown: "file", "edit", and "view". However, if a user may click on "file" a different pull-down menu 208 may appear: this time the three options "action", "import", "export" may be displayed to the user. If the user may click on "action", the pull-down menu 210, he may be used to, may appear. Thus, the pull-down menus 206 and 210 may be equivalent. However, in the second user interface 202, the user may have to perform three clicks in order to perform his desired action: open a new file. Here, the three clicks may relate to "file", "action", "new".

A user not used to the second user interface 202 may be confused about the additional click he has to perform on the button "action". However, the inventive method and system may allow the user to perform his desired task in user interface 200 using a pointing device, e.g., a computer mouse, and at the same time a second pointer may perform equivalent actions/functions in the second user interface 202. Thus, mapping actions between the first user interface 200 and actions of the second user interface 202 may be required. Exactly this is the objective of the mapping description. Such a mapping description may be made available in, e.g., XML (eXtensible Markup Language). Alternatives have been mentioned above already.

Referring now to FIG. 3, an exemplary listing of statements as part of a mapping description 300 is shown, according to an embodiment of the present disclosure. For a skilled person it may be clear that the <action1> shown in the top part of the Figure—between the elements "<OldPath>" and "<OldPath>"—may be equivalent to a click on "file" in the pull-down menu 206 (FIG. 2) of the first user interface 200 (FIG. 2). Similarly, <action2> may be equivalent to a click on "new" in the portal-down menu 206 (FIG. 2).

Equivalently, the following relationship may be built in the second user interface 202 (FIG. 2): "file"=<action1>, "action"=<action2>, "new"=<action3>.

It may also be clear that <action1> and <action2> in the first user interface 200 (FIG. 2) may represent a user interface pattern. The same may apply to <action1>, <action2>, <action3> in the second user interface 202 (FIG. 2). Both user interface patterns may have the same result: a new file may be opened. Thus, the examples listed in FIG. 3 show a simple mapping of a user interface pattern from the first user interface 200 (FIG. 2) to a user interface pattern and the second user interface 202 (FIG. 2).

Referring now to FIG. 4, an exemplary mapping system 400 is shown, according to an embodiment of the present disclosure. The mapping system 400 for a mapping of user interfaces may include a receiving unit 402 which may be adapted for a reception of input events via a first user interface 200 (FIG. 2) and user interface mapper 404—or in short, interface mapper 404—which may be adapted for an interception (by an intercepting unit) of a communication between the first user interface 200 (FIG. 2) and an application (not shown). The mapping system 400 may include an aggregation unit 406 adapted for an aggregation of a series of the received input events to a first user interface pattern.

The mapping system 400 may also include a transformation unit 408 which may be adapted for transforming of the first user interface pattern to a second user interface pattern based on the mapping description 300 (FIG. 3). Furthermore, a user interface executor 410 may be part of the mapping system 400 and may be adapted for rendering or generating the second user interface pattern 202 (FIG. 2) in a second user interface in parallel to a rendering the first user interface pattern in the first user interface 200 (FIG. 2) such that both user interfaces are visible at the same time.

Embodiments of the invention may be implemented together with virtually any type of computer, regardless of the platform being suitable for storing and/or executing program code.

Referring now to FIG. 5, an exemplary computing system 500 suitable for executing the program code related to the proposed method for mapping interfaces is shown, according to an embodiment of the present disclosure.

The computing system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

Program/utility 514, having a set (at least one) of program modules 516, may be stored in memory 504 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the mapping system 400 (FIG. 4) for a mapping of user interfaces may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or another devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for a mapping of user interfaces, the method comprising:
   providing, by a computer, a mapping description between first user interactions required to access a functionality of a software program running in the computer via a first user interface and second user interactions required to access the same functionality of the software program via a second user interface, the mapping description is stored in a file comprising XML instructions associated with mapping actions between the first user interactions and the second user interactions, the XML instructions make the mapping description transferable between different programming environments, the first user interface comprises a first version of a user interface of the software program and the second user interface comprises a modified version of the user interface,
   wherein the first user interactions required to access the functionality using the first user interface are different from the second user interactions required to access the functionality using the second user interface;
   receiving the first user interactions via the first user interface, the first user interactions comprising a sequence of input events from the user;
   recording the first user interactions;
   capturing a communication between the first user interface and the software program;
   generating a first user interface pattern based on the recorded first user interactions, the first user interface pattern comprising one or more of the first user interactions;
   converting, in real-time, the first user interface pattern to a second user interface pattern based on the mapping description, wherein the second user interface pattern comprises the second user interactions corresponding to the first user interactions required to access the functionality of the software program using the second user interface;
   simultaneously displaying the second user interface pattern in the second user interface and the first user interface pattern in the first user interface such that both the first user interface and the second user interface are visible to the user, wherein the simultaneous display provides the user with real-time information as to the functionality of the software program on the second user interface by interacting with the first user interface;
   recording, by the computer, the second user interface pattern on the second user interface; and
   automatically running the recorded second user interface pattern on the second user interface such that information about accessing the functionality of the software program using the second user interface is available to the user while interacting with the first user interface.

2. The method according to claim 1, wherein the first user interface is associated with a first version of the software program and the second user interface is associated with a second version of the software program.

3. The method according to claim 1, wherein simultaneously displaying the first user interface and the second user interface is performed side-by-side on the same device.

4. The method according to claim 1, wherein simultaneously displaying the first user interface and the second user interface is performed on different devices.

5. The method according to claim 4, wherein the second user interface is displayed on a device with a different form factor.

6. The method according to claim 5, wherein a message is generated if displaying of a data element on the device having the different form factor is not possible.

7. The method according to claim 1, wherein the first user interactions and the second user interactions comprise an event, an input, a click of a pointing device, or a character.

8. A mapping system for a mapping of user interfaces, the system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the mapping system is capable of performing a method comprising:
   providing, by a computer, a mapping description between first user interactions required to access a functionality of a software program running in the computer via a first user interface and second user interactions required to access the same functionality of the software program via a second user interface, the mapping description is stored in a file comprising XML instructions associated with mapping actions between the first user interactions and the second user interactions, the XML instructions make the mapping description transferable between different programming environments, the first user interface comprises a first version of a user interface of the software program and the second user interface comprises a modified version of the user interface, wherein the first user interactions required to access the functionality using the first user interface are different from the second user interactions required to access the functionality using the second user interface;

receiving the first user interactions via the first user interface, the first user interactions comprising a sequence of input events from the user;

recording the first user interactions;

capturing a communication between the first user interface and the software program;

generating a first user interface pattern based on the recorded first user interactions, the first user interface pattern comprising one or more of the first user interactions;

converting, in real-time, the first user interface pattern to a second user interface pattern based on the mapping description, wherein the second user interface pattern comprises the second user interactions corresponding to the first user interactions required to access the functionality of the software program using the second user interface;

simultaneously displaying the second user interface pattern in the second user interface and the first user interface pattern in the first user interface such that both the first user interface and the second user interface are visible to the user, wherein the simultaneous display provides the user with real-time information as to the functionality of the software program on the second user interface by interacting with the first user interface;

recording, by the computer, the second user interface pattern on the second user interface; and automatically running the recorded second user interface pattern on the second user interface such that information about accessing the functionality of the software program using the second user interface is available to the user while interacting with the first user interface.

9. The mapping system according to claim 8, wherein the first user interface is associated with a first version of the software program and the second user interface is associated with a second version of the software program.

10. The mapping system according to claim 8, wherein simultaneously displaying the first user interface and the second user interface is performed side-by-side on the same device.

11. The mapping system according to claim 8, wherein simultaneously displaying the first user interface and the second user interface is performed on different devices.

12. The mapping system according to claim 11, wherein the second user interface is displayed on a device with a different form factor.

13. The mapping system according to claim 12, wherein a message is generated if displaying of a data element on the device having the different form factor is not possible.

14. The mapping system according to claim 8, wherein the first user interactions and the second user interactions comprise an event, an input, a click of a pointing device, or a character.

15. A computer program product for a mapping of user interfaces, the computer program product comprising:

a computer readable non-transitory article of manufacture tangibly embodying computer readable instructions which, when executed, cause a computer to carry out a method comprising:

providing, by a computer, a mapping description between first user interactions required to access a functionality of a software program running in the computer via a first user interface and second user interactions required to access the same functionality of the software program via a second user interface, the mapping description is stored in a file comprising XML instructions associated with mapping actions between the first user interactions and the second user interactions, the XML instructions make the mapping description transferable between different programming environments, the first user interface comprises a first version of a user interface of the software program and the second user interface comprises a modified version of the user interface, wherein the first user interactions required to access the functionality using the first user interface are different from the second user interactions required to access the functionality using the second user interface;

receiving the first user interactions via the first user interface, the first user interactions comprising a sequence of input events from the user;

recording the first user interactions;

capturing a communication between the first user interface and the software program;

generating a first user interface pattern based on the recorded first user interactions, the first user interface pattern comprising one or more of the first user interactions;

converting, in real-time, the first user interface pattern to a second user interface pattern based on the mapping description, wherein the second user interface pattern comprises the second user interactions corresponding to the first user interactions required to access the functionality of the software program using the second user interface;

simultaneously displaying the second user interface pattern in the second user interface and the first user interface pattern in the first user interface such that both the first user interface and the second user interface are visible to the user, wherein the simultaneous display provides the user with real-time information as to the functionality of the software program on the second user interface by interacting with the first user interface;

recording, by the computer, the second user interface pattern on the second user interface; and automatically running the recorded second user interface pattern on the second user interface such that information about accessing the functionality of the software program using the second user interface is available to the user while interacting with the first user interface.

16. The computer program product according to claim 15, wherein the first user interface is associated with a first version of the software program and the second user interface is associated with a second version of the software program.

17. The computer program product according to claim 15, wherein simultaneously displaying the first user interface and the second user interface is performed side-by-side on the same device.

18. The computer program product according to claim 15, wherein simultaneously displaying the first user interface and the second user interface is performed on different devices.

19. The computer program product according to claim 18, wherein the second user interface is displayed on a device with a different form factor.

20. The computer program product according to claim 19, wherein a message is generated if displaying of a data element on the device having the different form factor is not possible.

\* \* \* \* \*